US012580970B2

(12) United States Patent
Ananthakrishnan

(10) Patent No.: US 12,580,970 B2
(45) Date of Patent: Mar. 17, 2026

(54) COMPUTERIZED SECURITY PLATFORMS INCLUDING A ROLE-BASED PERMISSIONS SYSTEM

(71) Applicant: Auradine, Inc., Santa Clara, CA (US)

(72) Inventor: Viswesh Ananthakrishnan, Palo Alto, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/214,799

(22) Filed: May 21, 2025

(65) Prior Publication Data

US 2025/0365322 A1 Nov. 27, 2025

Related U.S. Application Data

(60) Provisional application No. 63/650,230, filed on May 21, 2024.

(51) Int. Cl.
H04L 9/40 (2022.01)
H04L 29/06 (2006.01)

(52) U.S. Cl.
CPC .......... H04L 63/205 (2013.01); H04L 63/105 (2013.01)

(58) Field of Classification Search
CPC ..... H04L 63/205; H04L 63/105; H04L 63/20; H04L 63/10; H04L 63/108; G06F 21/30; G06F 21/31; G06F 21/40
See application file for complete search history.

(56) References Cited

U.S. PATENT DOCUMENTS

| | | | |
|---|---|---|---|
| 10,986,131 B1 * | 4/2021 | Kruse | H04L 63/10 |
| 11,570,167 B1 | 1/2023 | Eshun et al. | |
| 11,765,207 B1 | 9/2023 | McCarthy | |
| 12,278,847 B1 | 4/2025 | Ananthakrishnan et al. | |
| 2007/0244897 A1 * | 10/2007 | Voskuil | G06F 16/2308 |
| | | | 707/999.009 |
| 2008/0235023 A1 | 9/2008 | Kennewick et al. | |
| 2013/0305311 A1 | 11/2013 | Puttaswamy Naga et al. | |

(Continued)

OTHER PUBLICATIONS

Vaswani et al., "Attention Is All You Need," Presented at the 31st Conference on Neural Information Processing Systems (NIPS 2017), Long Beach, CA, Dec. 4-9, 2017; Computer Science—Computation and Language, submitted on Dec. 6, 2017, arXiv:1706.03762, pp. 1-11.

(Continued)

*Primary Examiner* — Edward Zee
(74) *Attorney, Agent, or Firm* — Fish & Richardson P.C.

(57) ABSTRACT

In an example method, a computer system accessing first natural language user input representing a request to generate security policies for a computerized security platform, and generates the security policies using a computerized large language model (LLM). Generating the one or more security policies includes determining an identity of the computerized security platform, providing at least a portion of the first natural language user input and the identity of the computerized security platform to the LLM, and receiving, from the LLM, first output data representing the security policies. The first output data has a computer language syntax that is compatible with the computerized security platform. Further, the system causes the security policies to be presented to a user and to be stored on a computerized storage device.

19 Claims, 6 Drawing Sheets

(56) References Cited

U.S. PATENT DOCUMENTS

| 2019/0007454 | A1 | 1/2019 | Nimmagadda et al. |
| 2019/0132214 | A1 | 5/2019 | Porras et al. |
| 2019/0327273 | A1 | 10/2019 | Bryson et al. |
| 2019/0364072 | A1 | 11/2019 | Purusothaman et al. |
| 2022/0224535 | A1 | 7/2022 | Coffing |
| 2022/0311805 | A1 | 9/2022 | Talati et al. |
| 2023/0206005 | A1 | 6/2023 | Olabiyi et al. |
| 2023/0269099 | A1 | 8/2023 | Medvinsky et al. |
| 2023/0326212 | A1 | 10/2023 | Chawda et al. |
| 2024/0045990 | A1 | 2/2024 | Boyer et al. |
| 2025/0097237 | A1 | 3/2025 | Parla |

OTHER PUBLICATIONS

International Search Report and Written Opinion in International Application No. PCT/US2025/030382, mailed on Jul. 21, 2025, 12 pages.
International Search Report and Written Opinion in International Application No. PCT/US2025/030392, mailed on Jul. 21, 2025, 14 pages.

* cited by examiner

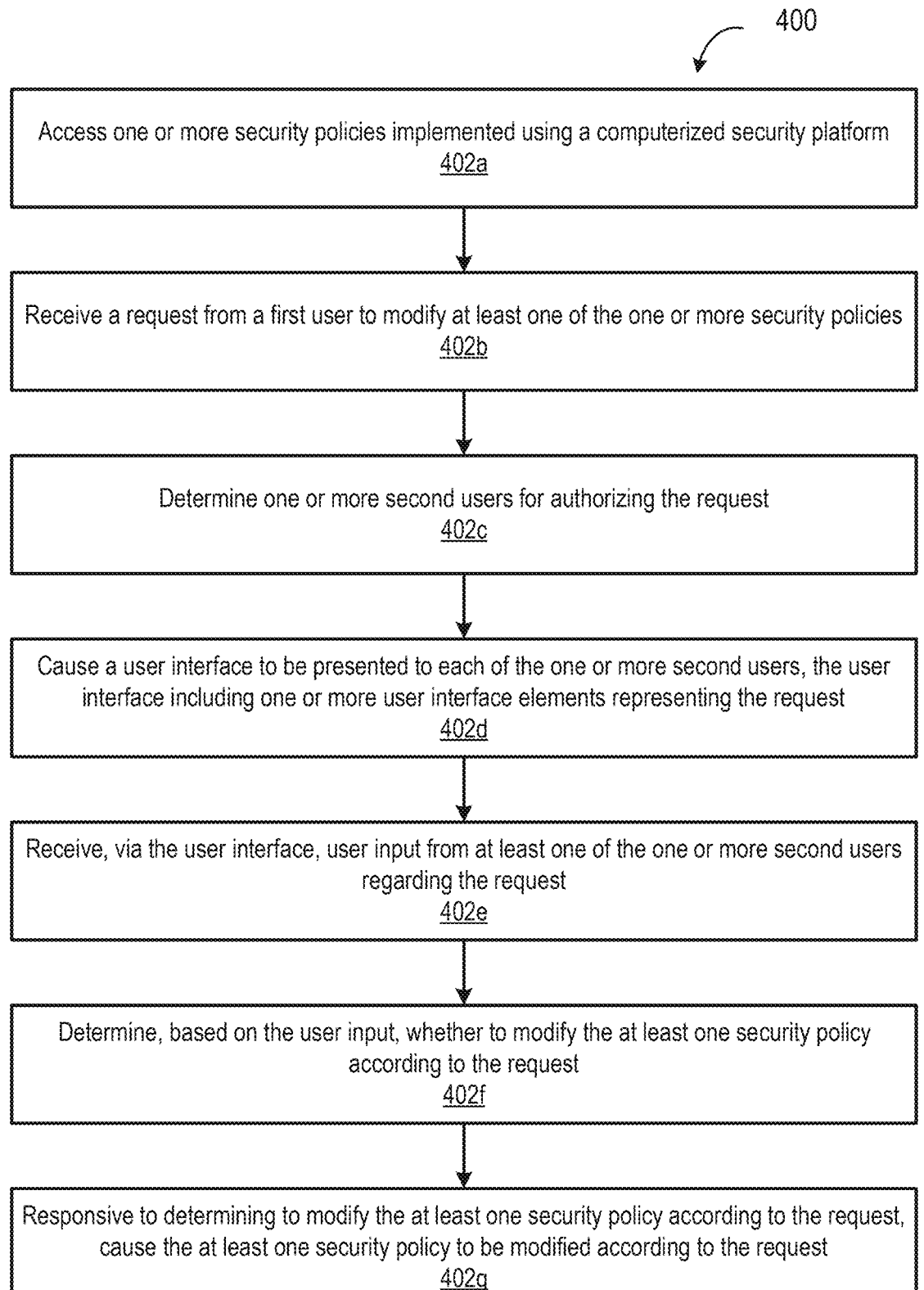

400

Access one or more security policies implemented using a computerized security platform
402a Receive a request from a first user to modify at least one of the one or more security policies
402b Determine one or more second users for authorizing the request
402c Cause a user interface to be presented to each of the one or more second users, the user interface including one or more user interface elements representing the request
402d Receive, via the user interface, user input from at least one of the one or more second users regarding the request
402e Determine, based on the user input, whether to modify the at least one security policy according to the request
402f Responsive to determining to modify the at least one security policy according to the request, cause the at least one security policy to be modified according to the request
402g

FIG. 4

COMPUTERIZED SECURITY PLATFORMS INCLUDING A ROLE-BASED PERMISSIONS SYSTEM

CROSS-REFERENCE TO RELATED APPLICATION

This application claims priority to U.S. Provisional Patent Application No. 63/650,230, filed May 21, 2024, the entire contents of which are incorporated herein by reference.

TECHNICAL FIELD

This disclosure relates generally to computerized security platforms that include a role-based permissions system.

BACKGROUND

In general, computerized security platforms can regulate the use of one or more computer systems by one or more users. As an example, a computerized security platform can selectively permit one or more users and/or computer systems to access one or more other computer systems (e.g., via a communications network). As another example, the computerized security platforms can selectively restrict one or more users and/or computer systems from accessing one or more other computer systems.

In some implementations, a computerized security platforms can operate in accordance with one or more security policies (e.g., sets of rules specifying the manner by which use of one or more computer systems are to be controlled by the computerized security platform).

SUMMARY

In general, a computerized security platform can facilitate the management of security policies through a role-based permissions system. For example, a computerized security platform can maintain a collaborative environment in which users can collectively view, add, remove, edit, and/or request changes to the security policies for implementation by the computerized security platform. Each user may be permitted to perform certain operations with respect to the security policies based on their role(s) with respect to an organization. For instance, the computerized security platform can allow an end user to review and request changes to security policies that pertain to the user, but restrict the user from removing or editing those security policies or from adding new security policies. Further, the computerized security platform can allow a system administrator to view, add, remove, and/or edit security policies.

The implementations described herein can provide various technical benefits. As an example, the implementations described herein facilitate the collaboration between multiple users regarding the maintenance of security policies, including selectively providing users with certain permissions based on their respective roles at an organization. Accordingly, the security policies can be controlled in a cohesive manner that reflects the collective will of the organization, while reducing the likelihood that the security policies are compromised by unauthorized or malicious users.

In addition, the computerized security platform can be configured to implement interim security policies within a computerized security platform that employs long-term or permanent security rules. In some implementations, the systems incorporate a computerized generative artificial intelligence (AI) to automatically generate interim security policies using historical patterns or through analysis of users' behavior(s).

An interim security policy enables non-permanent (e.g., temporary) changes to the overall security policies of the computerized security platform without changes to permanent or long-term security rules of the computerized security platform. For example, the interim security policy can be coded as a "one-time event," that allows a temporary exception to the security rules. In contrast, computer systems that do not implement interim security policies may have rigid security rules that undergo several security protocols before implementing changes in order to preserve the "security posture" of those alternate computer systems.

Advantageously, the interim security policy does not require edits, revisions, or direct changes to the security rules. In computer systems that do not use interim security policies, long-term security rules and rule exceptions are commingled within the security platform. Over time, particularly as administrators change, or the security platform is changed or upgraded, the rule exceptions and security rules become comingled in a manner that makes it difficult for administrators to distinguish between rule exceptions and permanent rules.

As new security rules are introduced as part of regular maintenance or upgrades to the security platform, impact of existing and new rules can become difficult to assess. As such, even though rule exceptions and older legacy security rules could be deleted, administrators may opt not to remove the rule exceptions due to inadequate or inability to access the impact of the rule exception. Accordingly, without interim security policies, the security platform can become bloated with intractable and stale rules that create security loopholes.

The systems and techniques for implementing the interim security policies render the security platform more secure, because the interim security policies are readily distinguishable from the security rules and do not involve editing or direct changes to the security rules. In some implementations, the interim security policies can be stored in a separate memory of the overall security platform. In some implementations, the interim security policies can be coded with a different protocol or different language than the security rules. In some implementations, the interim security policies are retrieved from remote storage and executed at specific insertion points within the security platform. In addition, because the interim security policies are easily distinguished from the security rules, the interim security policies can be removed, deleted, or altered without creating the security loopholes that can occur in systems that do not implement the interim security policies.

In an aspect, a method includes: providing, by one or more processors, a computerized collaborative environment for maintaining one or more security policies for a computerized security platform; providing, by the one or more processors, access to the computerized collaborative environment to a plurality of users; receiving, by the one or more processors via the computerized collaborative environment, first user input from a first user regarding the one or more security policies, where the first user input includes at least one of: a request to modify the one or more security policies, a request to generate a copy of the one or more security policies on the computerized collaborative environment, a request to test the one or more security policies, or a request to deploy the one or more security policies to the computerized security platform; and in response to the first user input, performing at least one of: modifying the one or more security policies, generating the copy of the one or more security policies on the computerized collaborative environment, performing one or more tests with respect to the one or more security policies, or deploying the one or more security policies to the computerized security platform.

Implementations of this aspect can include one or more of the following features.

In some implementations, the method can further include: accessing a diagram representing a configuration of a computerized network, determining, based on the diagram, an effect of the one or more security policies with respect to the computerized network, and causing information regarding the effect of the one or more security policies with respect to the computerized network to be presented to a user.

In some implementations, the diagram can be a Universal Modeling Language (UML) diagram.

In another aspect, a method includes: accessing, by one or more processors, one or more security policies implemented using a computerized security platform; receiving, by the one or more processors, a request from a first user to modify at least one of the one or more security policies; determining, by the one or more processors, one or more second users for authorizing the request; causing, by the one or more processors, a user interface to be presented to each of the one or more second users, where the user interface includes one or more user interface elements representing the request; receiving, by the one or more processors via the user interface, user input from at least one of the one or more second users regarding the request; determining, by the one or more processors based on the user input, whether to modify the at least one security policy according to the request; and responsive to determining to modify the at least one security policy according to the request, causing the at least one security policy to be modified according to the request.

Implementations of this aspect can include one or more of the following features.

In some implementations, the user input can include an indication that at least some of the one or more second users approved the request, and the method can further include, responsive to receiving the indication that at least some of the one or more second users approved the request, modifying the at least one security policy according to the request.

In some implementations, the method can further include: receiving a second request from a third user to modify at least one of the one or more security policies; determining one or more fourth users for authorizing the second request; causing, a second user interface to be presented to each of the one or more fourth users, wherein the second user interface includes one or more user second interface elements representing the second request; receiving, via the second user interface, second user input from at least one of the one or more fourth users regarding the second request; determining, based on the second user input, whether to modify the at least one security policy according to the second request; and responsive to determining not to modify the at least one security policy according to the second request, refraining from modifying the at least one security policy according to the second request.

In some implementations, the user input can include an indication that none of one or more fourth users approved the request, and the method can further include, responsive to receiving the indication that none of the one or more fourth users approved the request, refraining from modifying the at least one security policy according to the second request.

In some implementations, the user input can include at least one of: an indication that at least some of the one or more second users approved the request, or an indication that at least some of the one or more second users did not approve the request.

In some implementations, the one or more user interface elements can further represent an approval status of the request.

In some implementations, at least one of the one or more second users is authorized the administer the computerized security platform, and the first user is not authorized to administer the computerized security platform.

In some implementations, causing the at least one security policy to be modified according to the request can include deleting the at least one security policy.

In some implementations, causing the at least one security policy to be modified according to the request can include changing the at least one security policy.

In some implementations, causing the at least one security policy to be modified according to the request can include adding one or more additional security policies for implementation by the computerized security platform.

In some implementations, the one or more security policies can include a first set of security rules applicable to at least one of a set of users or a set of files for a first period of time, the first set of security rules executable in an order of priority, and an interim security policy that is different from the first set of security rules. The interim security policy can be applicable to at least one of: (i) a subset of the set of users for a second period of time that is less than the first period of time, or (ii) a subset of the set of files for a second period of time that is less than the first period of time.

In some implementations, the interim security policy can include at least one of a bypassing or an exception to the first set of security rules.

In some implementations, the method can further include (i) determining, in the first set of security rules, an insertion point among the order of priority, and (ii) executing, at the insertion point and in the first set of security rules, the interim security policy, where the interim security policy is separately stored from the first set of security rules.

In some implementations, the method can further include executing the interim security policy before the first set of security rules.

In some implementations, the method can further include determining that the first set of security rules includes (i) a first rule having a first priority, and (ii) a second rule having a second priority lower than the first priority, and executing the interim security policy before executing the second rule.

In some implementations, the first set of security rules can include at least one of (i) a first rule enabling one or more first computers to transmit data to one or more second computers over a computer network, and (ii) a second rule preventing one or more third computers to receive data to one or more fourth computers over a computer network.

In some implementations, the first set of security rules can include at least one of (i) a first rule enabling one or more first users to access one or more first network resources of a computer network communicatively coup, or (ii) a second rule preventing one or more second users from accessing one or more second resources of a computer network.

In some implementations, the method can further include causing, after a predetermined number of access occurrences, the interim security policy to expire.

In some implementations, the method can further include causing, upon equaling or exceeding the second period of time, the interim security policy to expire.

Other embodiments of this aspect include corresponding computer systems, apparatus, and computer programs recorded on one or more computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by a data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates an example process that can be performed using a security policy generation engine.

Like reference numbers and designations in the various drawings indicate like elements.

DETAILED DESCRIPTION

Figure 1:
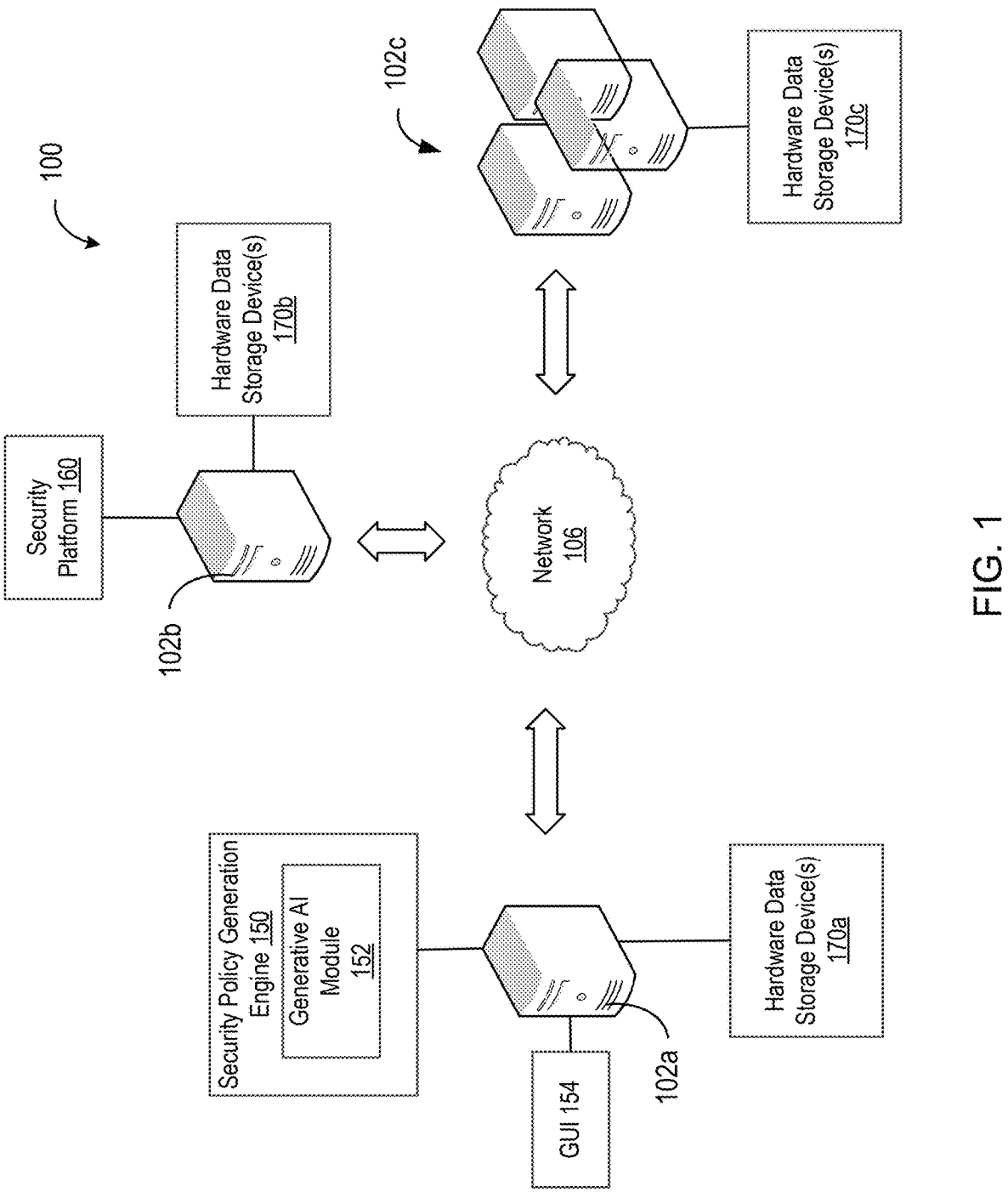
FIG. 1 shows an example system, including a security policy generation engine, for automatically generating and maintaining security policies for a computerized security platform.

FIG. 1 shows an example system 100 having a security policy generation engine 150 implemented on a first computer system 102a, a security platform 160 implemented on a second computer system 102b and several additional computer systems 102c. Each of the computer systems 102a-102c are communicatively coupled to one another via a network 106.

During operation of the system 100, the security platform 160 controls access by the computer systems 102c (and its associated users) to resources provided by the system 100. As an example, the security platform 160 can selectively allow certain computer systems 102c (and its associated users) to access certain other computer systems 102c, while preventing certain computer systems 102c (and its associated users) from accessing certain computer system 102c. Accessing a computer system can include establishing a network connection with the computer system, transmitting data to the computer system, retrieving data from the computer system, and/or logging into the computer system (e.g., using login credentials such a username, password, security certificate, etc.). As another example, the security platform 160 can selectively allow certain computer systems 102c (and its associated users) to access certain network resources, storage resources, memory resources, computational resources, and/or other any other resources provided by the system 100, while preventing certain computer systems 102c (and its associated users) from accessing certain resources. In some implementations, the security platform 160 can include one or more computer security mechanisms, such as a firewall, to facilitate performance of these operations.

In some implementations, the security platform 160 can operate in accordance with one or more security policies (e.g., sets of rules specifying the manner by which use of one or more computer systems are to be controlled by the security platform 160). In some implementations, the security policies are expressed using a particular computer language, syntax, and/or convention that is specific to the security platform 160 (also referred to as the "grammar" of the security policies). For example, in some implementations, a security policy that is compatible with the security platform 160 (e.g., such that it can be interpreted and deployed by the security platform 160) is expressed according to a particular computer language, syntax, and/or convention. Further, deviations from that computer language, syntax, and/or convention may render the security policy incompatible with the security platform 160. Further, the computer language, syntax, and/or convention that is used by the security platform 160 may be different from those offered by other security platforms (e.g., security platforms developed by a different entity than that of the security platform 160, a different version or generation of a security platform, etc.).

In some implementations, the security policy generation engine 150 can receive natural language user input from a user representing a request to generate one or more security policies for the security platform 160. Based on the natural language user input, the security policy generation engine 150 generates the requested security policies using a generative artificial intelligence (AI) module 152 having one or more computerized large language models (LLMs). In some implementations, the security policy generation engine 150 provides the requested security policies to the user for review and/or deploys the requested security policies using the security platform 160 (e.g., such that the security policies are implemented with respect to one or more of the computer systems 102c).

Further, the security policy generation engine 150 can use the generative AI module 152 to automatically generate security policies such that they are directly compatible with the security platform 160, without requiring that its users have specific knowledge regarding the computer language, syntax, or conventions used by the security platform 160 to define security policies. This allows users to specify security policies for the security platform 160 in an intuitive and platform agnostic manner (e.g., by specifying the desired security policies in natural language), rather than requiring that the user have intimate knowledge of the computer language, syntax, and/or conventions that are specific to the security platform (which may be different from that of other security platforms). Accordingly, the learning curve associated with administering the security platform 160 is substantially reduced.

Further, the security policy generation engine 150 can facilitate the management of security policies through a role-based permissions system. For example, the security policy generation engine 150 can maintain a collaborative environment in which users can collectively view, add, remove, edit, and/or request changes to the security policies for implementation by a computerized security platform. Each user may be permitted to perform certain operations with respect to the security policies based on their role(s) with respect to an organization. For instance, the security policy generation engine 150 can allow an end user to review and request changes to security policies that pertain to the user, but restrict the user from removing or editing those security policies or from adding new security policies. Further, the security policy generation engine 150 can allow a system administrator to view, add, remove, and/or edit security policies (e.g., to fulfill the end user's requests, deploy additional security measures, etc.).

As described above, the system 100 includes a security policy generation engine 150 implemented on a computer system 102a. The security policy generation engine 150 includes a generative AI module 152 having one or more computerized LLMs. Example LLMs include models having or more generative pre-trained transformers (GPTs), such as those implemented using or more artificial neural networks.

During an example operation of the system 100, a user instructs the security policy generation engine 150 to generate one or more security rules for controlling access by the computer systems 102c (and its associated users) to resources provided by the system 100 using the security platform 160. As an example, using a graphical user interface (GUI) 154, the user can provide a narrative description of the security policy and/or specify the desired effect of the security policies. Further, the user can also specify the identity of the security platform 160 (e.g., the name of the security platform 160, the developer of the security platform 160, the version of the security platform 160, the type of the security platform, etc.). In some implementations, the user can input natural language commands (e.g., in the form of sentences and/or phrases) using the GUI 154, such as by inputting text into a text box of the GUI 154. In some implementations, the user can input natural language commands via spoken input (e.g., by uttering commands into a microphone of the computer system 102a).

Based the user's input, the security policy generation engine 150 generates one or more security policies for implementation by the security platform 160. For example, using the generative AI module 152, the security policy generation engine 150 generates one or more security policies that are consistent with the user's description of the security policies and/or would produce the effect specified by the user (e.g., if those security policies were be to deployed by the security platform 160). Further, the one or more security policies are expressed using computer language, syntax, and/or conventions that are specific to the security platform 160, such that the one or more security policies can be directly implemented by the security platform 160 without further modifying the security policies.

In some implementations, the generative AI module 152 can generate security policies based on additional information regarding the system 100. For instance, the generative AI module 152 can access information regarding the architecture and/or configuration of the system 100. Further, the generative AI module 152 can access information regarding existing security policies implemented by the security platform 160. Based on this information, the generative AI module 152 can generate security policies that are customized specifically for the system 100.

As an example, a user can request that the security policy generation engine 150 generate a security policy that allows a "Computer A" and "Computer B" from among the computer systems to communicate with each other via the network 106 (e.g., "please generate a security policy that allows Computers A and B to communicate with each other over the network"). To aid in the generation of the security policy, the security policy generation engine 150 can access a system map that indicates the identity of each of the computer systems 102c (e.g., name, network address, etc.), and the interconnections between each of the computer systems 102c (e.g., network links across the network 106 that allow the computer systems 102c to communicate with one another). Further, the security policy generation engine 150 can access each of the security policies that are currently deployed by the security platform 160 (e.g., security policies that may restrict communications by the Computer A and/or the Computer B via the network 106). In turn, this information is provided the generative AI module 152. Based on this information, the generative AI module 152 generates a security policy that specifically enables Computers A and B to communicate with each other over the network 106, using computer language, syntax, and/or conventions specific to the security platform 160. For instance, the security policy can indicate the specific identity of Computers A and B (e.g., name, network address, etc.) in a manner that would be understood by the security platform 160. Further, the security policy can include one or more computer functions or commands to cause the security platform 160 to allow Computers A and B to communicate with one another (e.g., an "allow" command to a configurable firewall of the security platform 160).

As another example, a user can request that the security policy generation engine 150 generate a security policy that prevents a "Computer C" from accessing an external network (e.g., "please generate a security policy that prevents Computer C from accessing external networks, such as the Internet"). To aid in the generation of the security policy, the security policy generation engine 150 can access a system map that indicates the identity of each of the computer systems 102c and the interconnections between each of the computer systems 102c. Further, the security policy generation engine 150 can access each of the security policies that are currently deployed by the security platform 160. In turn, this information is provided the generative AI module 152. Based on this information, the generative AI module 152 generates a security policy that specifically prevents Computer B from communicating over the specified external network, using computer language, syntax, and/or conventions specific to the security platform 160. For instance, the security policy can indicate the specific identity of Computer C (e.g., name, network address, etc.) in a manner that would be understood by the security platform 160. Further, the security policy can include one or more computer functions or commands to cause the security platform 160 to prevent Computer C from accessing the specified computer network (e.g., a "block" command to a configurable firewall of the security platform 160).

In some implementations, the security policy generation engine 150 can generate security policies in an iterative manner based on user feedback. For instance, the user can initially provide the security policy generation engine 150 with a first command to generate a security to achieve a particular effect on one or more of the computer systems 102c. Based on the first command, the security policy generation engine 150 can generate intermediate output (e.g., using the generative AI module 152). For example, the intermediate output can include a request for additional information from the user (e.g., if the user's request was ambiguous and/or did not include sufficient information to generate a security policy). As an example, the intermediate output can include a proposed security policy generated by the generative AI module 152 (e.g., a natural language description of the proposed security policy and/or the proposed security policy expressed using computer language, syntax, and/or conventions specific to the security platform 160).

In response, the user can provide additional input to the security policy generation engine 150 and/or the generative AI module 152 to facilitate generation and/or refinement of a security policy. For example, the user can provide the additional information requested by the security policy generation engine 150 and/or the generative AI module 152. As another example, the user can indicate to the security policy generation engine 150 and/or the generative AI module 152 that the proposed security policy should be modified in some way. As another example, the user can indicate to the security policy generation engine 150 and/or the generative AI module 152 that the proposed security policy is acceptable. Based on the user's additional input, the generative AI module 152 generates, modifies, or maintains the proposed security policy, and presents the security policy to the user.

In some implementations, at least some of the generated security policies can be stored locally (e.g., using the hardware data storage devices(s) 170a or 170b local to the computer systems 102a or 102b, respectively). In some implementations, at least some of the generated security policies can be stored remotely (e.g., using the computer systems 102c and hardware data storage devices 170c remote from the computer system 102a and 102b).

In some implementations, at least some of the generated security policies can be directly implemented by or deployed on the security platform 160. For instance, the security platform 160 can control access by the computer systems 102c (and its associated users) to resources provided by the system 100 in accordance with one or more of the generated security policies. As an example, the security platform 160 can selectively allow certain computer systems 102c (and its associated users) to access certain other computer systems 102c in accordance with one or more of the generated security policies, while preventing certain computer systems 102c (and its associated users) from accessing certain computer system 102c in accordance with one or more of the generated security policies. As another example, the security platform 160 can selectively allow certain computer systems 102c (and its associated users) to access certain network resources, storage resources, memory resources, computational resources, and/or other any other resources provided by the system 100 in accordance with one or more of the generated security policies, while preventing certain computer systems 102c (and its associated users) from accessing certain resources in accordance with one or more of the generated security policies.

In some implementations, at least some of the generated security policies can be presented to the user via the GUI 154. For example, the GUI 154 can include graphical user elements (e.g., text and/or images) representing the generated security policies themselves and/or a natural language description of the security policies.

In general, each of the computer systems 102a-102c can include any number of electronic devices that are configured to receive, process, and transmit data. Examples of the computer systems include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer systems can include computing devices that operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, one or more of the computer systems need not be located locally with respect to the rest of the system 100, and one or more of the computer systems can be located in one or more remote physical locations.

Each the computer systems 102a-102c can include a respective user interface (e.g., GUI 154) that enables users interact with the computer system, other computer systems, the security policy generation engine 150, and/or the security platform 160. Example interactions include viewing data, transmit data from one computer system to another, and/or issuing commands to a computer system. Commands can include, for example, any user instruction to one or more of the computer system to perform particular operations or tasks. In some implementations, a user can install a software application onto one or more of the computer systems to facilitate performance of these tasks.

In FIG. 1, the computer systems 102a and 102b are illustrated as single respective components. However, in practice, the computer systems 102a and/or 102b can be implemented on one or more respective computing devices (e.g., each computing device including at least one processor such as a microprocessor or microcontroller). As an example, the computer system 102a can be a single computing device that is connected to the network 106, and the security policy generation engine 150 can be maintained and operated on the single computing device. As another example, the computer system 102a can include multiple computing devices that are connected to the network 106, and the security policy generation engine 150 can be maintained and operated on some or all of the computing devices. For instance, the computer system 102a can include several computing devices, and the security policy generation engine 150 can be distributed on one or more of these computing devices.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
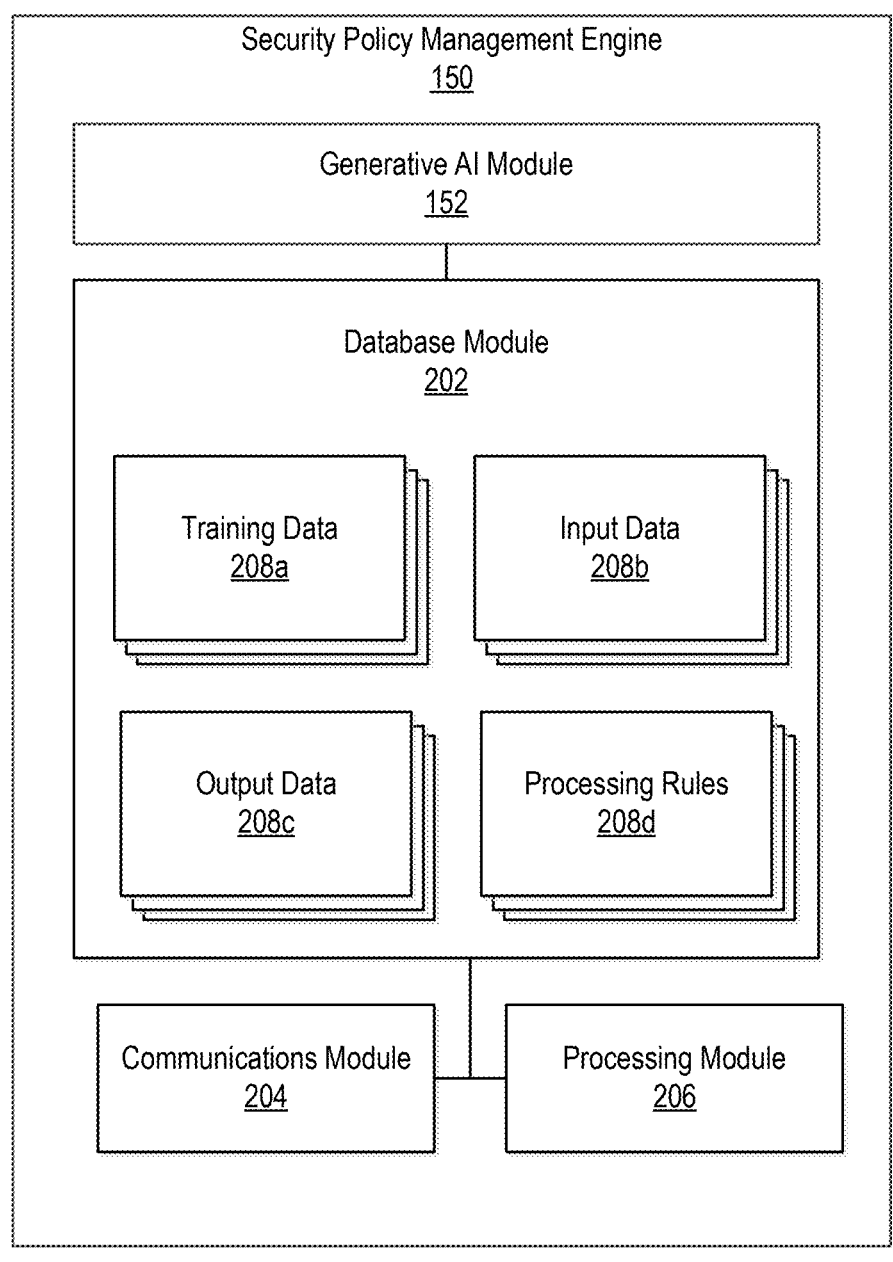
FIG. 2 shows an example security policy generation engine.

FIG. 2 shows various aspects of the security policy generation engine 150. In general, the security policy generation engine 150 includes several operation modules that perform particular functions related to the operation of the security policy generation engine 150. For example, the security policy generation engine 150 includes a generative AI module 152. Further, the security policy generation engine 150 includes a database module 202, a communications module 204, and a processing module 206. The operation modules can be provided as one or more computer executable software modules, hardware modules, or a combination thereof. For example, one or more of the operation modules can be implemented as blocks of software code with instructions that cause one or more processors of the security policy generation engine 150 to execute operations described herein. In addition or alternatively, one or more of the operations modules can be implemented in electronic circuitry such as, e.g., programmable logic circuits, field programmable logic arrays (FPGA), or application specific integrated circuits (ASIC).

The database module 202 maintains information related to generating security policies using the generative AI module 152.

As an example, the database module 202 can store training data 208*a* for training or prompting the generative AI module 152. In some implementations, the training data 208*a* can include example security policies (e.g., security policy exemplars), such as those previously generated by the security policy generation engine 150 and/or those manually produced by one or more human users. Further, the training data 208*a* can include natural language descriptions of one or more of those security policies.

As another example, the training data 208*a* can include information regarding example computer systems (e.g., computer system exemplars), including the identity of those systems and the interconnections between those computer systems (e.g., via one or more network links). Further, the training data 208*a* can include example security policies that have been implemented with respect to those computer systems, and information regarding the effects of those security policies on those computer systems.

As another example, the training data 208*a* can include information regarding one or more types of security platforms. For instance, the training data 208*a* can information regarding an entity that developed a security platform, and the versions of the security platform that were made available to users. Further, the training data 208*a* can include information regarding computer language, syntax, and/or conventions that are specific to the security platform. For instance, the training data 208 can include example commands or functions that can be interpreted by the security platform, and example security policies expressed using those commands or functions. Further, the training data 208 can include a natural language description of the commands or functions, as well as a natural language description of the example security policies.

Further, the database module 202 can store input data 208*b* that is used as an input to the generative AI module 152. As an example, the input data 208*b* can include commands or instructions provided by a user, including information regarding a particular desired output of the security policy generation engine 150. For instance, the input data 208*b* can include information regarding a particular desired effect of a security policy. Further, the input data 208*b* can indicate the identity of the specific security platform 160 with which the security policies will be deployed (e.g., product name, version, type, etc.).

Further, the input data 208*b* can include information retrieved by the security policy generation engine 150 in support of the security policy generation process. As an example, the input data 208*b* can include data regarding the configuration of the system 100 (e.g., the configuration of the computer systems 102*c*) and/or the security policies that are presently implemented by the security platform 160.

Further, the database module 202 can store output data 208*c* generated by the generative AI module 152. As an example, the output data 208*c* can include one or more portions of content (e.g., text, images, tables, etc.) generated by the generative AI module 152 based on the input data 208*b*, such as generated security policies, natural language descriptions of those security policies, etc.

Further, the database module 202 can store processing rules 208*d* specifying how data in the database module 202 can be processed to generate security policies using the generative AI module 152.

As an example, the processing rules 208*d* can include one or more rules for implementing, prompting, and operating the generative AI module 152 to produce the output data 208*c*. For instance, the one or more rules can specify that the training data 208*a* be provided to the generative AI module 152 for training or prompting (e.g., such that the generative AI module 152 can identify trends and/or correlations between the training data 208*a* and/or input data 208*b*, and generate new output based on those identified trends and/or correlations).

As another example, the one or more rules can specify that the input data 208*b* be provided to the generative AI module 152 (e.g., to generate output data 208*c* representing the security policies, a description of those security policies, etc.).

As another example, the one or more rules can specify that the generated output data 208*c* be presented to the user and/or stored for future retrieval and/or processing (e.g., using the database module 202).

As another example, the one or more rules can specify one or more computerized tools that facilitate the performance of particular actions by the generative AI module 152. For example, the tools can specify certain actions, operations, or functions that can be performed by the generative AI module 152 to retrieve data and to generate content based on the retrieved data.

Example data processing techniques are described in further detail below.

As described above, the security policy generation engine 150 also includes a communications module 204. The communications module 204 allows for the transmission of data to and from the security policy generation engine 150. For example, the communications module 204 can be communicatively connected to the network 106, such that it can transmit data to and receive data from the computer systems 102*b* and/or 102*b*. Information received from the computer systems 102*b* and/or 102*c* can be processed (e.g., using the processing module 206) and stored (e.g., using the database module 202).

As described above, the security policy generation engine 150 also includes a processing module 206. The processing module 206 processes data stored or otherwise accessible to the security policy generation engine 150. For instance, the processing module 206 can be used to execute one or more of the operations described herein (e.g., operations associated with the generative AI module 152).

In some implementations, a software application can be used to facilitate performance of the tasks described herein. As an example, an application can be installed on the computer systems 102*a*. Further, a user can interact with the application to input data and/or commands to the security policy generation engine 150, and review data generated by the security policy generation engine 150.

In some implementation, the security policy generation engine 150 can generate security policies for multiple different security platforms, each of which may have differing levels of compatibility with respect to their security policies. As an example, a first security platform can be configured to interpret and deploy security policies expressed according to a first computer language, syntax, and/or convention, and a second security platform can be configured to interpret and deploy security policies expressed according to a second, different computer language, syntax, and/or convention that is not compatible with the first computer language, syntax, and/or convention. However, the security policy generation engine 150 can selectively generate different security policies that are specific to either or both of the security policies (e.g., by identify each security platform, and generating customized security policies that are compatible with that security platform). In some implementations, the security policy generation engine 150 can automatically identify the security platform (e.g., the name version, and/or type of the security platform), and generate security policies compatible with that security platform. In some implementations, the security policy generation engine 150 can identify the security platform based on manual input from a user, and generate security policies based on the manual input.

As described above, in some implementations, the security policy generation engine 150 can facilitate the management of security policies through a role-based permissions system. For example, the security policy generation engine 150 can maintain a collaborative environment in which users can collectively view, add, remove, edit, and/or request changes to the security policies for implementation by a computerized security platform. Changes made by one user to the security policies are recorded to displayed to each of the other users (e.g., in real time or substantially real time), such that users can collectively generate, maintain, and revise the security policies.

In some implementations, the collaborative environment can track changes to the security policies according to a version tracking system. For example, the collaborative environment can record each of the changes made by a user to the security policies, and associate the identity of the user with the change (e.g., such that other users can determine which user made each change to the security policies). Further, the collaborative environment can allow users to reverse changes (e.g., "revert" the security policies to an earlier version) and/or further revise the security policies.

In some implementations, the collaborative environment can allow users to "check out," "fork," or "mirror" at least a portion of the security policies, such that the user can make changes to a copy of the security policies without propagating the changes to the version of the security policies seen by the other users. This allows the user to work on proposed changes to the security policies, without affect the work of the broader group. Further, the collaborative environment can allow users to 'check in" or "merge" any changes that were made back into the collaboratively maintained version of the security policies (e.g., to deploy those changes to a broader group of users).

In some implementation, the collaborative environment can allow users to maintain a first set of security policies that are presently deployed by a security platform (e.g., a "production" version of the security policies), and separately maintain a second set of security policies with proposed changes to the first set of security policies (e.g., a "development" version of the security policies). Further, the collaborative environment can allow users to selectively deploy the development version of the security policies to the security platform (e.g., when those the security policies have been sufficiently checked for errors, omissions, conflicts, unintended behavior, etc.). This is beneficial, for example, as it allows the users to iteratively revise and evaluate the performance of the security policies, prior to those security policies actually being used to control the operations of the computer systems and/or networks.

In some implementations, the security policy generation engine 150 can predict the effect of one or more security policies on one or more computer systems and/or networks, and present the predicts to a user for consideration. For example, as described above, the security policy generation engine 150 access a system map that indicates the identity of each of the computer systems 102c (e.g., name, network address, etc.), and the interconnections between each of the computer systems 102c (e.g., network links across the network 106 that allow the computer systems 102c to communicate with one another). Further, the security policy generation engine 150 can access each of the security policies that are currently deployed by the security platform 160 and/or a proposed to be deployed by the security platform 160, and determine the effect of those security policies on the computer system 102c. For example, the security policy generation engine 150 can predict that, upon deployment of the security policies, the security platform 160 would permit certain computer systems to certain other computer systems, resources, etc. As another example, the security policy generation engine 150 can predict that, upon deployment of the security policies, the security platform 160 would prevent or block certain computer systems from accessing certain other computer systems, resources, etc. In some implementations, the system map can include data in the form of a Universal Modeling Language (UML) diagram.

In some implementations, each user may be permitted to perform certain operations with respect to the security policies based on their role(s) with respect to an organization. Further, the security policy generation engine 150 can selectively permit users to perform those operations in accordance with their assigned roles.

For instance, each user can be assigned a particular role with respect to an organization (e.g., a company, team, etc.), and each role can be associated with a different respective set of permissions with respect to the security policies. As an example, a user can be assigned the role of an end user (e.g., a user that is authorized to use one or more computer systems of the organization, but is not otherwise responsible for administering the operation of the organization's computer network or managing the organization's security system efforts). The security policy generation engine 150 can permit this user to perform certain limited tasks with respect to the security policies (e.g., viewing the security policies, requesting changes to the security policies, etc.), but otherwise preventing the user from performing other sensitive tasks (e.g., modifying the security policies, adding new security policies, removing security policies, etc.).

As another example, a user can be assigned the role of a system administrator (e.g., a user that is responsible for administering the operation of the organization's computer network or managing the organization's security system efforts). The security policy generation engine 150 can permit this user to perform a wider array of tasks with respect to the security policies (e.g., viewing the security policies, requesting changes to the security policies, modifying the security policies, adding new security policies, removing security policies, etc.) to facilitate the performance of his duties.

In some implementations, users can request and authorize changes via the collaboration system. For instance, a user can submit to the collaboration system a request to change the security policies in some way (e.g., delete a security policy, change the security policy, add a security policy). The collaboration system can determine one or more other users that are authorized to approve (or deny) the changes, and transmit a notification to those users. Based on the users' responses, the collaboration system can selectively permit or block the changes from being made to the security policies.

As an example, upon receiving a request from a first user to change a security policy, the collaborative environment can identify one or more second users that are responsible for maintain the security policies at issue, and transmit notifications to the second users regarding the proposed changes. Notifications can include, for example, text message, emails, chat messages, electronic "tickets" (e.g., an electronic record of the request, including text content, images, etc.), telephone calls, etc. summarizing the proposed changes, the user that requested the change, and/or any other information pertaining to the proposed change.

The second users can respond to the notifications by indicating to the collaborative environment whether they approve of the changes. For example, a second user can indicate whether the approve the change by transmitting a message or other indication to the collaborative environment (e.g., a text message, email, chat message, computer command, etc.). Further, the second user can indicate the specific changes to the security policies. In some implementation, the user can indicate the specific changes using computer language, syntax, and/or conventions specific to the security platform 160. In some implementations, the user can indicate the specific changes using natural language, and the collaborative environment can generate the corresponding changes to the security policies using the security policy generation engine 150 and/or the generative AI module 152.

Based on the second user's feedback, the collaborative environment can selectively permit or block the changes from being made to the security policies. Further, the collaborative environment can notify the first user regarding the decision made by the second user (e.g., by transmitting a notification to the first user summarizing the second user's feedback) and/or any changes that were made to the security policies based on the request.

In some implantations, the collaborative environment can present a "dashboard" GUI to each of the users (e.g., a GUI 154) that includes graphical elements that represent the status of one or more requests made by users, and the statuses of each of those requests. In some implementations, the status of a request can include information regarding the user can made the request, the users that have been selected to approve or deny the request, the nature of the request, whether the request has been approved or denied, and any changes that were made to the security policies based on the request.

Example Generative AI Modules

In general, the generative AI module 152 is a deep learning model that operates according to the principle of self-attention (e.g., a computer-specific technique that mimics cognitive attention). For example, the generative AI module 152 differentially weighs the significance of each part of an input (which includes the recursive output) data, and uses one or more attention mechanism to provide context for any position in the input sequence.

A generalized architecture of a generative AI module is described below.

Input:

In general, input data strings are parsed into tokens (e.g., by a byte pair encoding tokenizer). Further, each token is converted via a word embedding into a vector. In some implementations, positional information of the token can be added to the word embedding.

Encoder/Decoder Architecture:

In general, a generative AI module includes a decoder. Further, in some implementations, the generative AI module can also include an encoder. An encoder includes one or more encoding layers that process the input iteratively one layer after another, while the decoder includes one or more decoding layers that perform a similar operation with respect to the encoder's output.

Each encoder layer is configured to generate encodings that include information about which parts of the inputs are relevant to each other, and passes these encodings to the next encoder layer as inputs. Each decoder layer performs the functional opposite, by taking all the encodings and using their incorporated contextual information to generate an output sequence. To achieve this, each encoder and decoder layer can make use of an attention mechanism.

For each part of the input, an attention mechanism weights the relevance of every other part and draws from them to produce the output. Each decoder layer has an additional attention mechanism that draws information from the outputs of previous decoders, before the decoder layer draws information from the encodings.

Further, the encoder and/or decoder layers can have a feed-forward neural network for additional processing of the outputs and include residual connections and layer normalization steps.

As an example, one or more attention mechanism can be configured to implement scaled dot-product attention. For instance, when an input data string is passed into the generative AI module, attention weights can be calculated between every token simultaneously. An attention mechanism can produce embeddings for every token in context that include information about the token itself along with a weighted combination of other relevant tokens each weighted by its attention weight.

For each attention unit, the generative AI module learns three weight matrices; the query weights $W_Q$, the key weights $W_K$, and the value weights $W_V$. For each token i, the input word embedding $x_1$ is multiplied with each of the three weight matrices to produce a query vector $q_i=x_iW_Q$, a key vector $k_i=x_iW_K$, and a value vector $v_i=x_iW_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training, and passed through a softmax which normalizes the weights. The fact that $W_Q$ and $W_K$ are different matrices allows attention to be non-symmetric: if token j (e.g., $q_i \cdot k_j$ is large), this does not necessarily mean that token j will attend to token i (e.g., $q_j \cdot k_i$ could be small). The output of the attention unit for token i is the weighted sum of the value vectors of all tokens, weighted by $a_{ij}$, the attention from token i to each token.

The attention calculation for all tokens can be expressed as one large matrix calculation using the softmax function, which is useful for training due to computational matrix operation optimizations that quickly compute matrix operations. The matrices Q, K, and V are defined as the matrices where the ith rows are vectors $q_i$, $k_i$, and $v_i$, respectively. Accordingly, attention can be presented as:

$$\text{Attention}(Q, K, V) = softmax\left(\frac{QK^T}{\sqrt{d_k}}\right)V$$

where softmax is taken over the horizontal axis.

In general, one set of ($W_Q$, $W_K$, $W_V$) matrices may be referred to as an attention head, and each layer in a generative AI module can have multiple attention heads. While each attention head attends to the tokens that are relevant to each token, with multiple attention heads the model can do this for different definitions of "relevance."

In addition, the influence field representing relevance can become progressively dilated in successive layers. Further, the computations for each attention head can be performed in parallel, which allows for fast processing. The outputs for the attention layer are concatenated to pass into the feed-forward neural network layers.

Encoder:

In general, encoder can include two major components: a self-attention mechanism and a feed-forward neural network. The self-attention mechanism accepts input encodings from the previous encoder and weights their relevance to each other to generate output encodings. The feed-forward neural network further processes each output encoding individually. These output encodings are then passed to the next encoder as its input, as well as to the decoders.

The first encoder takes positional information and embeddings of the input sequence as its input, rather than encodings.

The encoder is bidirectional. Attention can be placed on tokens before and after the current token.

A positional encoding is a fixed-size vector representation that encapsulates the relative positions of tokens within a target sequence.

The positional encoding is defined as a function of type $f$: $\mathbb{R} \to \mathbb{R}^d$; $d \in \mathbb{Z}$, $d > 0$, where d is a positive even integer. The full position encoding can be represented as follows:

$$(f(t)_{2k}, f(t)_{2k} + 1) = (\sin(\theta), \cos(\theta)) \ \forall \ k \in \{0, 1, \ldots, d/2 - 1\}$$

$$\text{where } \theta = \frac{t}{r_k}, r = N^{2/d}.$$

Here, N is a free parameter that is significantly larger than the biggest k that would be input into the positional encoding function.

This positional encoding function allows the generative transformation model to perform shifts as linear transformations:

$$f(t + \Delta t) = \text{diag}(f \Delta t)) f(t)$$

where $\Delta t \in \mathbb{R}$ is the distance one wishes to shift. This allows the transformer to take any encoded position, and find the encoding of the position n-steps-ahead or n-steps-behind, by a matrix multiplication.

By taking a linear sum, any convolution can also be implemented as linear transformations:

$$\sum_j c_j f(t + \Delta t_j) = \left( \sum_j c_j \text{diag}(f(\Delta t_j)) \right) f(t)$$

for any constants $c_j$. This allows the transformer to take any encoded position and find a linear sum of the encoded locations of its neighbors. This sum of encoded positions, when fed into the attention mechanism, create attention weights on its neighbors, much like what happens in a convolutional neural network language model.

Although an example positional encoding technique is described above, in practice, other positional encoding techniques can also be performed, either instead or in addition to those described above. Further, in some implementations, the generative AI module need not perform positional encoding.

Decoder:

Each decoder includes three major components: a self-attention mechanism, an attention mechanism over the encodings, and a feed-forward neural network. The decoder functions in a similar fashion to the encoder, but an additional attention mechanism is inserted which instead draws relevant information from the encodings generated by the encoders. This mechanism can also be called the encoder-decoder attention.

Like the first encoder, the first decoder takes positional information and embeddings of the output sequence as its input, rather than encodings. The transformer does not use the current or future output to predict an output, so the output sequence is partially masked to prevent this reverse information flow. This allows for autoregressive text generation. For all attention heads, attention cannot be placed on following tokens. The last decoder is followed by a final linear transformation and softmax layer, to produce the output probabilities.

Additional information regarding generative AI modules can be found in "Attention Is All You Need," arXiv: 1706.03762 by Vaswani, et al., the contents of which are incorporated herein in their entirely.

Interim Security Policies

Figure 3A:
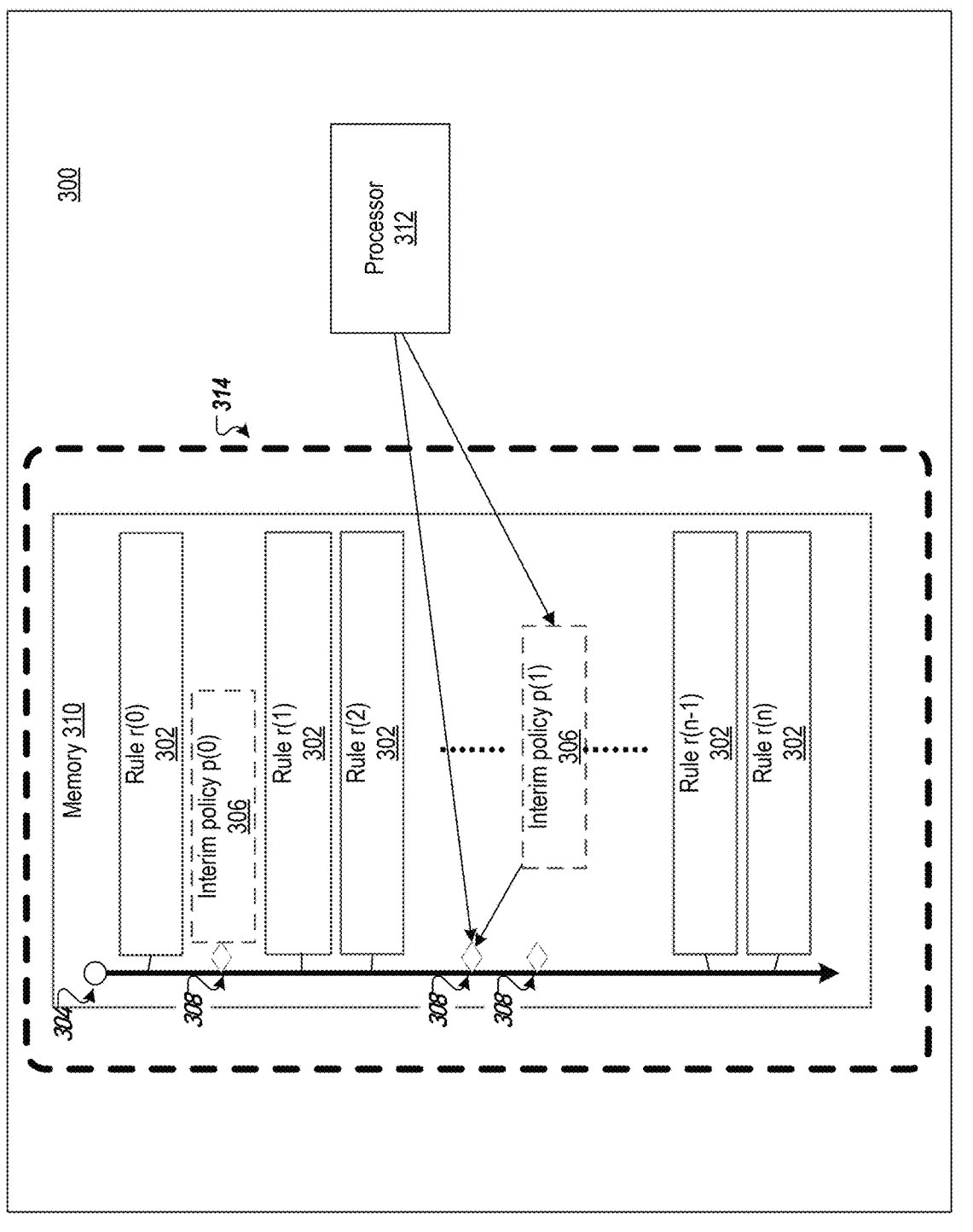
FIG. 3A illustrates an example system having a user interface for displaying interim security policies implemented within the security policies of the example system.

FIG. 3A illustrates an example system having a user interface (UI) 314 for displaying interim security policies 306 implemented within the security policies (e.g., security rules 302) of the example system. The UI 314 has substantially the same functionality as the GUI 154 described above. In some implementations, a computer system 300 is the example system. The computer system 300 is substantially the same as computer system 102a described above. In some implementations, computer system 300 is substantially the same as computer system 102b or 102c. In some implementations, the computer system 300 can implement features of 102a-102c.

Security rules 302 are stored in memory 310 of the computer system 300 according to a priority order 304. The order of priority 304 determines the order in which the rules are executed or prioritized. For example, security rules 302 can be stored in the memory 310 for a specific number of rules, n. In this example, rule r(0) has priority over rule r(1), and rule r(1) has priority over rule r(n). In non-limiting example, rule r(0) can prevent access to certain content on the system 100 that is known to be harmful or malicious. Rule r(1), in another example, can be confidential information that would cause serious material harm if released outside of the system 100. Rule (n), having a lower tiered order of priority 304 than rules r(0) and r(1), may be a data backup policy or an acceptable use policy. It is understood that these rules r(0)-r(n) are described as examples and that other rules and policies are applicable without departing from the scope of this disclosure.

An interim security policy 306 can be executed within the memory 310 at a specific an insertion point 308. The interim security policy 306 bypasses or provides exceptions to security rules 302. For example, the interim security policy 306 can temporarily disable one or more of the security rules 302 for a specific user, set of users, or a specific computer system or subset of computer systems. The interim security policy 306 does not overwrite or alter the security rules 302. Advantageously, implementing the interim security policies 306 on the system 100 enable a technician to establish short-term or short-use policies without editing or altering the security rules 302. When the interim security policy 302 is no longer executable, the interim security policies 306 can remain in the order of priority 304 or be removed from the order of priority 304 without affecting the security rules 302. One advantage to maintaining the interim security policies 306 in the order of priority 304 is that usage metrics or patterns can be determined. In some implementations, the interim security policy 306 can be deleted or de-indexed (i.e., having the insertion point 308 disabled or deleted) without affecting the security rules 302.

In contrast, systems that do not implement disclosed interim security policies 306 can accumulate a greater number of unused security policies that are expired, redundant, inactive, or obsolete. However, these unused security policies remain a part of security policies, bloating the overall security apparatus. Security administrator operating in systems that do not have interim security policies can have difficulty in determining that removal of the unused security policies will not compromise the overall security of those systems.

Where analysis determines that an interim security policy 306 is frequently utilized, the interim security policy 306 can be elevated to recommend for a permanent rule to be added to the security rules 302. As illustrated in FIG. 3, the order of priority 304 remains unchanged. Interim security policy p(0) is executed after rule r(0) and is executable before rules r(1)-r(n). Another interim policy p(1) is executable between rule r(2) and r(n−1). It is understood that the insertion points 308 and execution of the interim security policies 306 discussed herein, are examples. Accordingly, other examples can be implemented without departing from this disclosure.

The interim security policy 306 is executable for a specific time period. For example, a user or subset of user can be granted access to unsanctioned website for research for a period of seven days. When the time period is reached or exceeded, the interim security policy 306 is not executable. In some implementations, the interim security policy 306 is implemented for a specific number of times, e.g., a frequency. For example, a user or subset of users can be given permission to share confidential information a fixed number of times, e.g., twice, with an external partner that uses a computer system other than the system 100. The interim security policy 306 is not executable when the specific number of times is met or exceeded, i.e., the frequency is met is or exceeded. In some implementations, the interim security policy 306 is not executable when the predetermined time is met or exceeded. Accordingly, the interim security policy 306 can be either time-based, frequency-based, or a combination of both.

In some implementations, the interim security policy 306 is assigned or tethered to a specific security rule 302. In this example, one or more interim security policies 306 is triggered when the specific security rule 302 is executed. For example, when an interim security policy 306 can be triggered despite the location of its insertion point 308 when the interim security policy 306 is triggered by the given security rule 302. For example, executing rule r(o) can trigger interim security rule p(1). In another non-limiting example, executing rule r(n−1) can cause interim security policy p(0) and p(1) to execute.

A positive pass refers to the interim security policy 306 that grants access to a resource (e.g., website, file, program) that is prohibited by one or more security rules 302. Positive passes have been discussed above. A negative pass refers the interim security policy 306 that denies access to a resource (e.g., website, file, program) that is allowed by one or more security rules 302. In one non-limiting example, during a highly significant internal project, such as a merger or legal investigation, specific resources can be embargoed and thus prevented from being accessed, forwarded, or altered during until a specific date. In some implementations, an interim security rule 306 implemented as a positive pass or negative pass can be specified using keywords, concepts, or both. For example, a positive pass enables access, and a negative pass would block access to content, such as media, files, and websites having a specific project name. In another example, the positive pass or negative pass could enable or block content to related to concepts related to a merger and acquisition project, such as "merger," "acquisition," or "sale" or "purchase" of a specific company.

As illustrated, one or more interim policies p(0)-p(n) can be implemented in at one or more insertion points in the order of priority 304. The processor 312 provides instructions to anchor the insertion point 308 in the order of priority 304. In the example illustrated, the interim security policy 306 can reside in a same memory 310 as the security rules 302. While one memory 310 and processor 312 are shown, it is understood that the security rules 302, interim policies 306 can be distributed across one or memory or storage devices, and one or more processors 312 in the computing system 300.

The UI 314 can be implemented as a display that is locally or remotely coupled to the computing system 300. The UI 314 enables visualization of the priority order 304. By visualizing the priority order 304, an administrator can view the security rules 302, interim security policies 306, and the insertion points 308. Advantageously, an administrator can easily distinguish between the security rules 306 and interim security policies 306. Revisions, deletions, and changes to the order of priority of to the interim security policies 306 can be achieved visually by using the UI 314. In the manners described herein, analysis of the security rules 302 and interim security policies 306 can be conducted or verified using the visual aid of the UI 314.

In one example, an AI interim policy agent automatically generates or suggest an interim security policy in response to user input, such as user feedback, complaints, or administrator generated tickets, instant messaging, or backend IT system(s). The AI interim policy agent receives data based on the user input and automatically generates the interim policy. In some implementations, the AI interim policy agent determines the insertion point 308. The interim security policy 306 generated by the AI interim policy agent is reviewed by a technician before the interim security policy 306 is implemented in the order of priority 304. The technician can review or edit the interim security policy 306 generated by the AI interim policy agent. The AI interim policy agent can be implemented as the generative AI module described above.

Figure 3B:
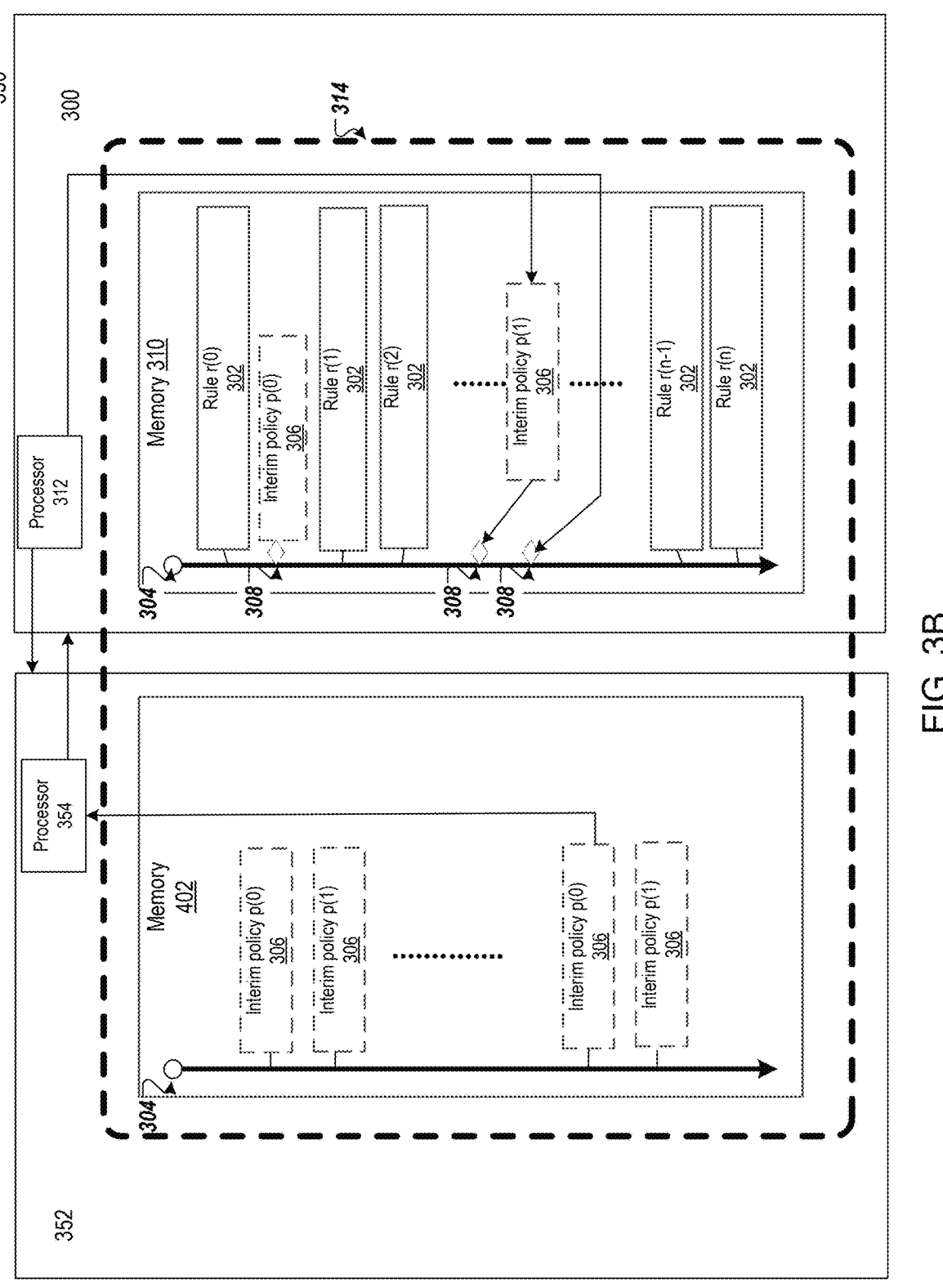
FIG. 3B illustrates an example of a distributed system having a user interface for displaying interim security policies within the security policies of the distributed system.

FIG. 3B illustrates an example of a distributed system having a UI 314 for displaying interim security policies 306 within the security policies of the distributed system. The UI 314, as similarly described above, can be implemented as a display that is locally or remotely coupled to either one of the computing system 300 or policy computer system 352. It is understood that while the distributed system 350 is shown with two computing systems (the computing system 300 and the policy computer system 352), the UI 314 and the techniques described herein, can be distributed across more than two computing systems.

In some implementations, a distributed computer system 350 is the distributed system. The distributed computer system 350 includes the computer system 300 and a policy computer system 352. In this implementation, the security rules 302 are stored on the computer system 300. The policy computer system 352 stores the interim security policies 306. The policy computer system 352 can be positioned locally or remotely from the computer system 300. Each of the computer system 300 and policy computer system 352 can be implemented as a part or an entirety of computer systems 102*a*-102*c*. As such, the interim security policies 306 can be stored on the security policy generation engine 150, the security platform 160 or a combination of the security policy generation engine 150 and the security platform 160.

In some implementations, at least some of the interim security policies 306 can be stored remotely from the security rules 302. Accordingly, in some implementations, the interim security policies 306 can be stored on the policy computer system 352 having its own processor 354. The processor 354 is in electronic communication with the processor 312 of the computer system 300. Implementations of the memory 310 and memory 354 are described below with respect to memory 620. In some implementations, either one or both of the memory 310 and memory 354 implements all of some of features of a storage device(s) 530. Each of the processor 312 and processor 354 is substantially similar to processor 510.

The interim security policies 306 can be implemented as a plug-n-play system. For example, using plug-n-play technology, an operating system can detect the presence of interim security policies 306. The operating system locates and installs the necessary drivers to enable communication between one or both of the computer system 300 and policy computer system 352.

A user interface (UI) 314 electrically coupled to the computer system 300 or the distributed computer system 350, enables the priority order 304 to be visualized. Thus, a topographical location of the security rules 302, interim security policies 306, and insertion points 308 are viewable through the UI 314 enabling an administrator to insert, verify, or remove the interim security policies 306. The UI 314 enables visualization of security rules 302 and interim security policies 306. Thus, in some implementations, expired, redundant, inactive, or obsolete interim security policies can be hidden from view while reviewing, analyzing, or editing security rules 302. In some implementations, the UI 314 can display time-based and frequency-based aspects of each interim security policy 306 limitations, including the length of time or number of times that each interim security policy 306 was triggered.

Example Processes

FIG. 4 shows an example process 400. In some implementations, the process 330 can be performed by the system 100 described in this disclosure (for example, the system 100 including the security policy generation engine 150 shown and described with reference to FIGS. 1 and 2) using one or more processors (for example, using the processor or processors 510 shown in FIG. 5).

In the process 400, a system access one or more security policies implemented using a computerized security platform (402*a*).

The system receives a request from a first user to modify at least one of the one or more security policies (402*b*).

The system determines one or more second users for authorizing the request (402*c*).

The system causes a user interface to be presented to each of the one or more second users (402*d*). The user interface includes one or more user interface elements representing the request.

The system receives, via the user interface, user input from at least one of the one or more second users regarding the request (402*e*).

The system determines, based on the user input, whether to modify the at least one security policy according to the request (402*f*).

Responsive to determining to modify the at least one security policy according to the request, the system causes the at least one security policy to be modified according to the request (402*g*).

In some implementations, the process 400 can further include: receiving a second request from a third user to modify at least one of the one or more security policies; determining one or more fourth users for authorizing the second request; causing, a second user interface to be presented to each of the one or more fourth users, wherein the second user interface includes one or more user second interface elements representing the second request; receiving, via the second user interface, second user input from at least one of the one or more fourth users regarding the second request; determining, based on the second user input, whether to modify the at least one security policy according to the second request; and responsive to determining not to modify the at least one security policy according to the second request, refraining from modifying the at least one security policy according to the second request.

In some implementations, the user input can include at least one of: an indication that at least some of the one or more second users approved the request, or an indication that at least some of the one or more second users did not approve the request.

In some implementations, the user input can include an indication that at least some of the one or more second users approved the request, and the method can further include, responsive to receiving the indication that at least some of the one or more second users approved the request, modifying the at least one security policy according to the request.

In some implementations, the user input can include an indication that none of one or more fourth users approved the request, and the method can further include, responsive to receiving the indication that none of the one or more fourth users approved the request, refraining from modifying the at least one security policy according to the second request.

In some implementations, the one or more user interface elements can further represent an approval status of the request.

In some implementations, at least one of the one or more second users is authorized the administer the computerized security platform, and the first user is not authorized to administer the computerized security platform.

In some implementations, causing the at least one security policy to be modified according to the request can include deleting the at least one security policy.

In some implementations, causing the at least one security policy to be modified according to the request can include changing the at least one security policy.

In some implementations, causing the at least one security policy to be modified according to the request can include adding one or more additional security policies for implementation by the computerized security platform.

In some implementations, the one or more security policies can include a first set of security rules applicable to at least one of a set of users or a set of files for a first period of time, the first set of security rules executable in an order of priority, and an interim security policy that is different from the first set of security rules. The interim security policy can be applicable to at least one of: (i) a subset of the set of users for a second period of time that is less than the first period of time, or (ii) a subset of the set of files for a second period of time that is less than the first period of time.

In some implementations, the interim security policy can include at least one of a bypassing or an exception to the first set of security rules.

In some implementations, the method can further include (i) determining, in the first set of security rules, an insertion point among the order of priority, and (ii) executing, at the insertion point and in the first set of security rules, the interim security policy, where the interim security policy is separately stored from the first set of security rules.

In some implementations, the method can further include executing the interim security policy before the first set of security rules.

In some implementations, the method can further include determining that the first set of security rules includes (i) a first rule having a first priority, and (ii) a second rule having a second priority lower than the first priority, and executing the interim security policy before executing the second rule.

In some implementations, the first set of security rules can include at least one of (i) a first rule enabling one or more first computers to transmit data to one or more second computers over a computer network, and (ii) a second rule preventing one or more third computers to receive data to one or more fourth computers over a computer network.

In some implementations, the first set of security rules can include at least one of (i) a first rule enabling one or more first users to access one or more first network resources of a computer network, or (ii) a second rule preventing one or more second users from accessing one or more second resources of a computer network.

In some implementations, the method can further include causing, after a predetermined number of access occurrences, the interim security policy to expire.

In some implementations, the method can further include causing, upon equaling or exceeding the second period of time, the interim security policy to expire.

Example Computer Systems

Figure 5:
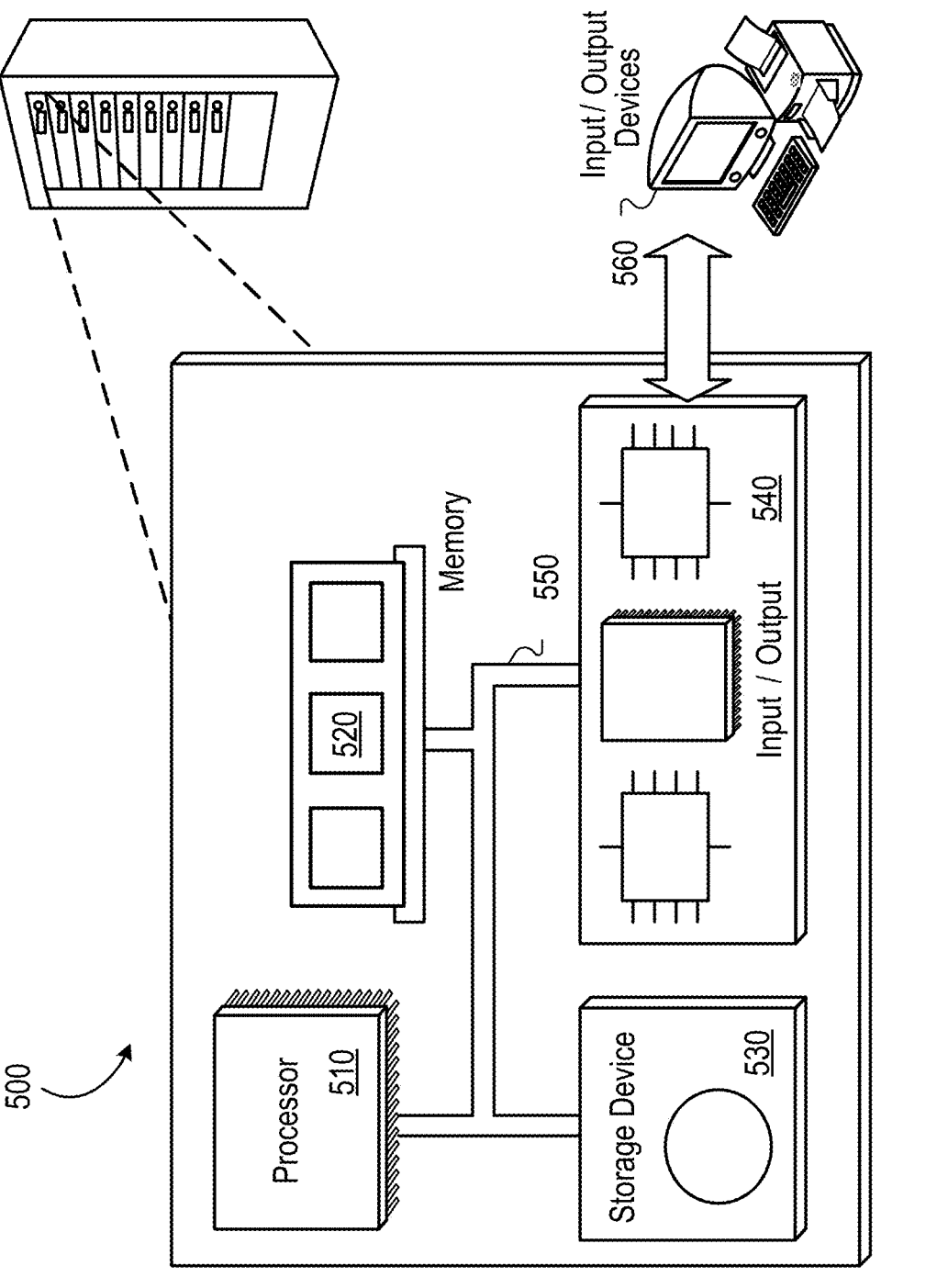
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. Further, the system 500 may be used the implement some or all of the systems or components described herein (e.g., one or more of the systems and components shown in FIG. 1, such as the computer systems 102a-102c, network 106, security policy generation engine 150, security platform 160, etc.). The system 500 may include one or more processors 510, a memory 520, one or more storage devices 530, and one or more input/output (I/O) devices 560 controllable through one or more I/O interfaces 540. The various components 510, 520, 530, 540, or 560 may be interconnected through at least one system bus 550, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 560. The I/O device(s) 560 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 560 may also include one or more output devices such as a display, LED(s), an audio output device (e.g., a speaker), a printer, a haptic output device, and so forth. The I/O device(s) 560 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 560. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LAN (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose micro-processors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

accessing, by one or more processors, one or more security policies implemented using a computerized security platform, wherein the one or more security policies comprise:

a first set of security rules applicable to at least one of a set of users or a set of files for a first period of time, the first set of security rules executable in an order of priority; and an interim security policy that is different from the first set of security rules, the interim security policy applicable to at least one of:

(i) a subset of the set of users for a second period of time that is less than the first period of time, or (ii) a subset of the set of files for the second period of time;

receiving, by the one or more processors, a first request from a first user to modify at least a first security policy of the one or more security policies;

determining, by the one or more processors, one or more second users for authorizing the first request;

causing, by the one or more processors, a first user interface to be presented to each of the one or more second users, wherein the first user interface comprises one or more first user interface elements representing the first request;

receiving, by the one or more processors via the first user interface, first user input from at least one of the one or more second users regarding the first request;

determining, by the one or more processors based on the first user input, whether to modify at least the first security policy according to the first request; and responsive to determining to modify at least the first security policy according to the first request, causing at least the first security policy to be modified according to the first request.

2. The method of claim 1, wherein the first user input comprises an indication that at least some of the one or more second users approved the first request, and wherein the method further comprises, responsive to receiving the indication that at least some of the one or more second users approved the first request, modifying at least first security policy according to the first request.

3. The method of claim 1, further comprising:

receiving a second request from a third user to modify at least a second security policy of the one or more security policies;

determining one or more fourth users for authorizing the second request;

causing, a second user interface to be presented to each of the one or more fourth users, wherein the second user interface comprises one or more user second interface elements representing the second request;

receiving, via the second user interface, second user input from at least one of the one or more fourth users regarding the second request;

determining, based on the second user input, whether to modify at least the second security policy according to the second request; and responsive to determining not to modify at least the second security policy according to the second request, refraining from modifying at least the second security policy according to the second request.

4. The method of claim 3, wherein the second user input comprises an indication that none of one or more fourth users approved the second request, and wherein the method further comprises, responsive to receiving the indication that none of the one or more fourth users approved the second request, refraining from modifying at least the second security policy according to the second request.

5. The method of claim 1, wherein the one or more first user interface elements further represents an approval status of the first request.

6. The method of claim 1, wherein at least one of the one or more second users is authorized to administer the computerized security platform, and wherein the first user is not authorized to administer the computerized security platform.

7. The method of claim 1, wherein causing at least the first security policy to be modified according to the first request comprises deleting at least the first security policy.

8. The method of claim 1, wherein causing at least the first security policy to be modified according to the first request comprises changing at least the first security policy.

9. The method of claim 1, wherein causing at least the first security policy to be modified according to the first request comprises adding one or more additional security policies for implementation by the computerized security platform.

10. The method of claim 1, wherein the interim security policy comprises at least one of a bypassing or an exception to the first set of security rules.

11. The method of claim 1, further comprising:

determining, in the first set of security rules, an insertion point among the order of priority; and executing, at the insertion point and in the first set of security rules, the interim security policy, wherein the interim security policy is separately stored from the first set of security rules.

12. The method of claim 1, further comprising:

executing the interim security policy before the first set of security rules.

13. The method of claim 1, further comprising:

determining that the first set of security rules comprises:

a first rule having a first priority; and a second rule having a second priority lower than the first priority; and executing the interim security policy before executing the second rule.

14. The method of claim 1, wherein the first set of security rules comprises at least one of:

a first rule enabling one or more first computers to transmit data to one or more second computers over a computer network; or a second rule preventing one or more third computers to receive data to one or more fourth computers over a computer network.

15. The method of claim 1, wherein the first set of security rules comprises at least one of:

a first rule enabling one or more first users to access one or more first network resources of a computer network; or a second rule preventing one or more second users from accessing one or more second resources of a computer network.

16. The method of claim 1, further comprising:

causing, after a predetermined number of access occurrences, the interim security policy to expire.

17. The method of claim 1, further comprising:

causing, upon equaling or exceeding the second period of time, the interim security policy to expire.

18. A system comprising one or more computers and one or more storage devices communicatively coupled to the one or more computers, wherein the one or more storage devices store instructions that, when executed, cause the one or more computers to perform operations comprising:

accessing one or more security policies implemented using a computerized security platform, wherein the one or more security policies comprise:

a first set of security rules applicable to at least one of a set of users or a set of files for a first period of time, the first set of security rules executable in an order of priority; and an interim security policy that is different from the first set of security rules, the interim security policy applicable to at least one of:

(i) a subset of the set of users for a second period of time that is less than the first period of time, or (ii) a subset of the set of files for the second period of time;

receiving a first request from a first user to modify at least at first security policy one of the one or more security policies;

determining one or more second users for authorizing the first request;

causing a first user interface to be presented to each of the one or more second users, wherein the first user interface comprises one or more user first interface elements representing the first request;

receiving, via the user interface, first user input from at least one of the one or more second users regarding the first request;

determining, based on the first user input, whether to modify at least the first security policy according to the request; and responsive to determining to modify at least the first security policy according to the first request, causing at least the first security policy to be modified according to the first request.

19. One or more non-transitory computer storage media storing instructions that, when executed, cause one or more computers to perform operations comprising:

accessing one or more security policies implemented using a computerized security platform, wherein the one or more security policies comprise:

a first set of security rules applicable to at least one of a set of users or a set of files for a first period of time, the first set of security rules executable in an order of priority; and an interim security policy that is different from the first set of security rules, the interim security policy applicable to at least one of:

(i) a subset of the set of users for a second period of time that is less than the first period of time, or (ii) a subset of the set of files for the second period of time;

receiving a first request from a first user to modify at least a first security policy of the one of the one or more security policies;

determining one or more second users for authorizing the first request;

causing a first user interface to be presented to each of the one or more second users, wherein the first user interface comprises one or more first user interface elements representing the first request;

receiving, via the first user interface, first user input from at least one of the one or more second users regarding the first request;

determining, based on the first user input, whether to modify at least the first security policy according to the first request; and responsive to determining to modify at least the first security policy according to the first request, causing at least the first security policy to be modified according to the first request.

* * * * *